No. 864,384. PATENTED AUG. 27, 1907.
W. W. NEWBERRY.
LAND MARKER FOR CORN PLANTERS.
APPLICATION FILED DEC. 29, 1906.
2 SHEETS—SHEET 2.
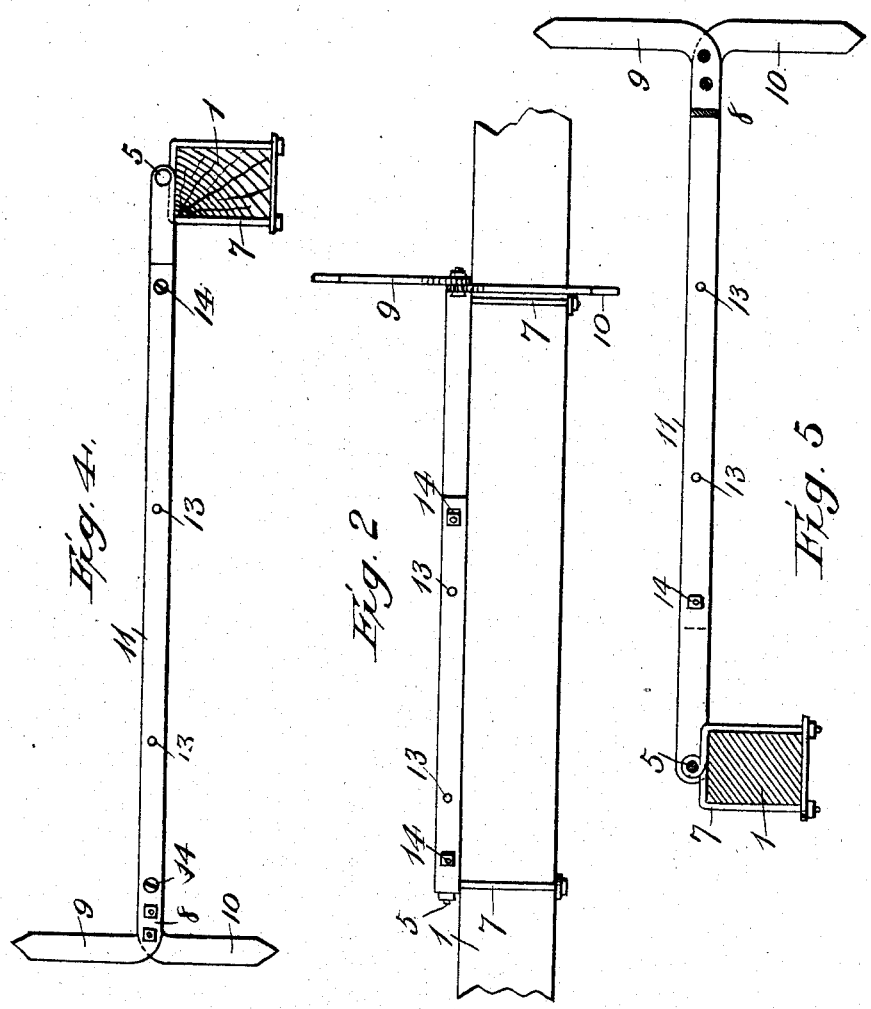

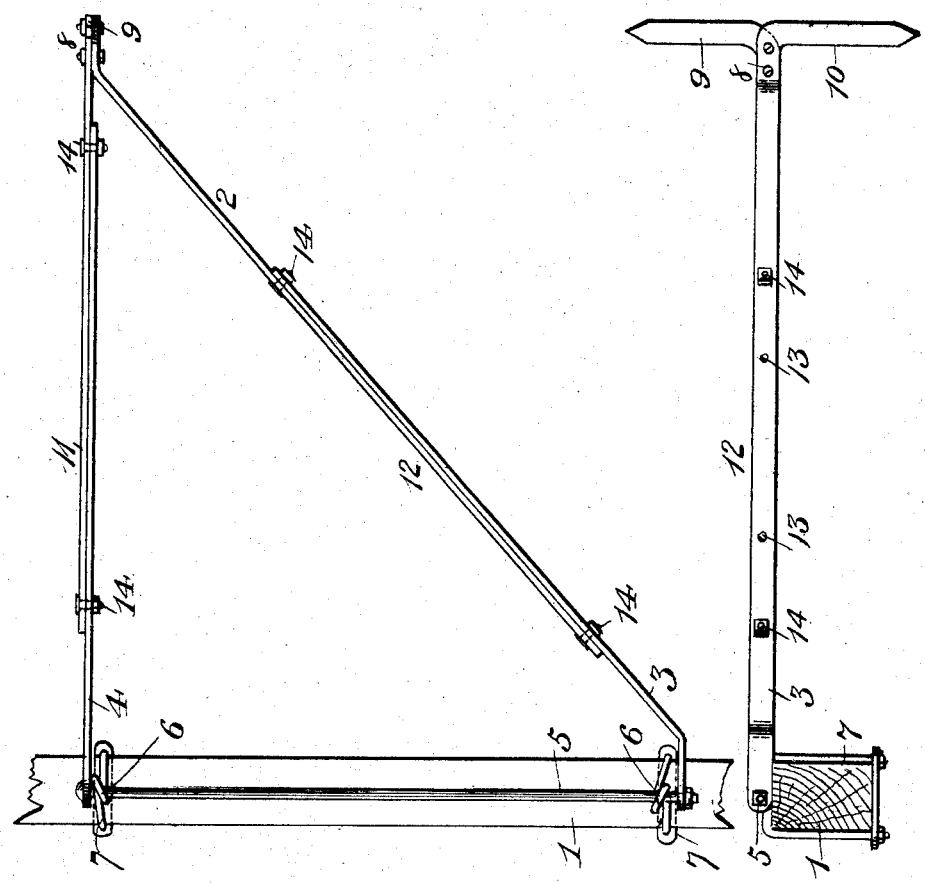

UNITED STATES PATENT OFFICE.

WILLIAM WASHINGTON NEWBERRY, OF DOTHAN, ALABAMA.

LAND-MARKER FOR CORN-PLANTERS.

No. 864,384.  Specification of Letters Patent.  Patented Aug. 27, 1907.

Application filed December 29, 1906. Serial No. 350,078.

*To all whom it may concern:*

Be it known that I, WILLIAM WASHINGTON NEWBERRY, a citizen of the United States, residing at Dothan, in the county of Houston and State of Alabama, have invented certain new and useful Improvements in Land-Markers for Corn-Planters, of which the following is a specification.

My invention relates to improvements in corn-planters, more particularly land-markers therefor. Its object is to provide for readily and effectively scoring or marking the ground for guidance in planting the subsequent rows of corn; for disposing the marker to the right or left; for rendering the marker readily adjustable according to the distance apart it may be desired to conduct the planting operation; and to accomplish these ends in a simple, economic and expeditious manner.

Said invention consists of certain structural features or instrumentalities substantially as hereinafter fully disclosed and specifically pointed out by the claims.

In the accompanying drawing illustrating the preferred embodiment of my invention—Figure 1 is a plan view thereof. Fig. 2 is a side elevation of the same. Figs. 3 and 4 are front and rear elevations thereof, respectively. Fig. 5 is a vertical or cross-section produced through the marker.

In carrying out my invention, I suitably attach to the ordinary plow beam or stock 1, of the corn-planter, the marking device 2 for suitably scoring or marking the ground for guidance, as before noted, for conducting the subsequent corn planting operation. Said marking device comprises preferably two sectional bars 3, 4 the inner ends of which are adapted to receive or have passed therethrough a pivoting or hinging nut-equipped rod 5 also passed through, and supported in position in eyes or loops 6 formed in keepers or clips 7 suitably applied and fastened to the plow beam or stock, for allowing the swinging or disposing of the marking device from side to side as relates to the plow beam or stock. Said sectional bars have their opposite or outer ends suitably joined or bolted together as at 8, preferably at two points, the rear bar extending outward at right-angles from the plow beam or stock and the forward bar being bent so as to extend diagonally rearward in effecting conjunction with said rear bar as shown. Said bars have their meeting end-portions extended upward and downward at right-angles thereto, respectively, as at 9, 10, and which right-angled end-portions or terminals are tapered at their extreme outer ends for forming the markers proper, for the purpose aforesaid. These markers proper 9, 10 are effective for separate use or engagement with the ground as the device is disposed or swung from right to left, according to the direction of movement of the corn planter in passing back and forth over the field, as will be readily appreciated. The sections or members 11, 12 of each of the aforesaid bars have extensible and retractable connection one with the other by means of a series or number of apertures 13 formed in each section or member and nut-equipped bolts 14 engaging said apertures, whereby said marking device may be rendered adjustable within certain limits, say from three to five feet, as may be desired in scoring or marking the ground. Also, the marker being adapted, by its pivotal or hinging connection with the plow beam or stock, to have a readily yielding movement in vertical lines, it will automatically accommodate itself to any unevenness in the ground or surface, also conform to the inclination or declivity of a hillside or sloping surface of the ground and thus maintain continuous contact or engagement therewith for the effective scoring or marking of the latter.

I claim—

1. A device as described, comprising bars, a plow-beam, and a pivoting rod for said bars supported upon said plow-beam, one of said bars extending outward from said rod at a right angle and the other of said bars extending outward diagonally from said rod, said bars having their outer ends connected together and extending vertically in opposite directions to serve as markers.

2. A device as described, comprising bars each consisting of extensible and retractable sections, a plow-beam and a pivoting rod for said bars, one of said bars extending outward from said plow-beam at a right angle thereto, and the other of said bars extending diagonally from said rod, said bars having their outer ends connected together and extending vertically in opposite directions for marking purposes.

3. A device as described, comprising bars, a plow-beam, a pivoting rod passing through apertures in the inner ends of said bars, and clips secured upon said plow-beam and having eyes receiving said rod, one of said bars extending outward from said rod at a right angle, and the other of said bars extending diagonally from said rod, said bars having their outer ends connected together and extending vertically in opposite directions for marking purposes.

In testimony whereof I have signed my name to this specification in the presence of two subscribing witnesses.

WILLIAM WASHINGTON NEWBERRY.

Witnesses:
 B. FAWLK,
 W. F. NEWTON.